(12) United States Patent
Elkady et al.

(10) Patent No.: US 11,947,944 B2
(45) Date of Patent: Apr. 2, 2024

(54) SYSTEM AND METHOD FOR PRODUCING AN UPDATE REPORT

(71) Applicant: SIGNIFY HOLDING B.V., Eindhoven (NL)

(72) Inventors: Mohamed Ahmed Mohamed Elkady, Eindhoven (NL); Daniel Martin Goergen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 455 days.

(21) Appl. No.: 17/276,316

(22) PCT Filed: Aug. 27, 2019

(86) PCT No.: PCT/EP2019/072781
§ 371 (c)(1),
(2) Date: Mar. 15, 2021

(87) PCT Pub. No.: WO2020/052960
PCT Pub. Date: Mar. 19, 2020

(65) Prior Publication Data
US 2022/0035617 A1 Feb. 3, 2022

(30) Foreign Application Priority Data
Sep. 14, 2018 (EP) ..................................... 18194382

(51) Int. Cl.
*H04W 24/02* (2009.01)
*G06F 8/65* (2018.01)
(Continued)

(52) U.S. Cl.
CPC ................ *G06F 8/65* (2013.01); *H04L 67/34* (2013.01); *H04M 1/72406* (2021.01); *H04W 24/02* (2013.01)

(58) Field of Classification Search
CPC ... H04W 24/02; H04M 1/72406; H04L 67/34; G06F 8/65
(Continued)

(56) References Cited

U.S. PATENT DOCUMENTS

2014/0130032 A1* 5/2014 Lipinski .................... G06F 8/65
717/171
2016/0073482 A1* 3/2016 Fok ........................ H05B 47/19
315/294
(Continued)

FOREIGN PATENT DOCUMENTS

CN 102255931 B 4/2017
WO 2018063260 A1 4/2018

*Primary Examiner* — Joel Ajayi

(57) ABSTRACT

A method of reporting on a software update performed on a network composed of at least a plurality of wireless devices. The method comprises, at a centralized network element: i) detecting properties of two or more wireless devices in the network, ii) reading the update to determine functions of the two or more devices which the updated is programmed to implement, and iii) receiving an update report reporting whether or not the software update was successfully installed in memory of the at least one wireless device; for each update reported to be successfully installed in iii), comparing the functions determined in ii) against the properties detected in i) to establish which functions are now enabled within the network, and which existing functions are now disabled due to the update; and creating and outputting to a user a customized report indicating the enabled and/or disabled functions.

13 Claims, 3 Drawing Sheets

(51) Int. Cl.
*H04L 67/00* (2022.01)
*H04M 1/72406* (2021.01)

(58) Field of Classification Search
USPC .......................................................... 455/418
See application file for complete search history.

(56) References Cited

U.S. PATENT DOCUMENTS

| | | | |
|---|---|---|---|
| 2016/0278187 A1* | 9/2016 | Amer | H05B 47/19 |
| 2016/0371074 A1 | 12/2016 | Vyas et al. | |
| 2018/0121192 A1 | 5/2018 | Riedl et al. | |
| 2018/0165157 A1 | 6/2018 | Olinsky et al. | |

* cited by examiner

SYSTEM AND METHOD FOR PRODUCING AN UPDATE REPORT

CROSS-REFERENCE TO PRIOR APPLICATIONS

This application is the U.S. National Phase application under 35 U.S.C. § 371 of International Application No. PCT/EP2019/072781, filed on Aug. 27, 2019, which claims the benefit of European Patent Application No. 18194382.0, filed on Sep. 14, 2018. These applications are hereby incorporated by reference herein.

TECHNICAL FIELD

The present disclosure relates to generating reports on software updates in a network of wireless devices.

BACKGROUND

The Internet of Things (IoT) field is growing rapidly, with many users adding to their home networks on a regular basis. With the addition of each new IoT device inevitably come new functions and features. It is further known from the field of IoT devices that firmware updates may be done to help execute a new hardware function, fix a known problem and/or bring software in compliance with new software standards.

US2016/0371074 A1 for example discloses how an access point (AP) of a wireless network receives registration requests for a firmware update from a set of IoT devices. The AP determines availability of the firmware update at a remote server and upon determining the availability downloads the firmware update from the remote server into a non-volatile storage and provides the firmware update to the set of IoT devices.

US2018/0165157 A1 discloses that firmware of an IoT device may be updated and after writing this update to memory a check is performed whether or not the updated release is valid/stable. Upon determination that this is not the case an auto-rollback is performed.

New function and features can be solely the result of the new device itself, or they can be a result of the new device working together with other, already established, devices. Similarly, new functions and features may arise as a result of software updates within the IoT network. In this case the hardware within the IoT network does not necessarily change (although the software update may coincide with the addition or removal of an IoT device), but the way in which it can be used within the IoT network by a user can change.

In the IoT field, IoT devices often have a companion application which functions to provide software updates to the IoT device. For example, in a lighting system, a bridge may be employed bridging between the lighting devices and a mobile companion application running on a mobile device. The bridge component is an example of an IoT device that can receive software updates, e.g. being received through the companion mobile application.

Typically, when a user receives a software update to their IoT device(s), they may be presented with the general release notes. These general release notes often contain a perfunctory list of changes. For example a categorisation of new or fixed features contained within that update such as 'update to lighting controls to fix bug', or 'new lighting features'. The user is not provided with any more information with regard to changes as a result of the update.

SUMMARY

It would be desirable to provide a mechanism for informing the user about software updates to a network of wireless devices (e.g. IoT network or lighting network) in a more personalized way, to provide information that exceeds the basic information that is customarily available in a changelog.

Particularly, the present disclosure provides a system which is able to report on the actual changes made to the functioning of the device(s), not just the attempted or intended changes. To do this, a centralized network element within the system collects information from the device(s) in question. The centralized element that collects the information may be any element of the wireless network or a wider network, e.g. a server, bridge, control unit, or mobile user device. It can then be established, based on the updates made, what the functional differences will be within that particular network or system. The system can thus establish which particular functions are now enabled and which particular functions are now disabled or broken, in particular if used often by the user, and create a customized report based thereon. In embodiments the system may even determine or recommend how to fix the disabled functions.

According to a first aspect disclosed herein, there is provided a method of reporting on a software update performed on a network composed of at least a plurality of wireless devices, wherein prior to the update the network is installed with operating software on one or more of the plurality of wireless devices which enables one or more existing functions across the plurality of wireless devices, and wherein the update is applied to the operating software on at least one of said one or more wireless devices and affects operation of two or more of the plurality of wireless devices; the method comprising, at a centralized network element:
  i) detecting one or more properties of the two or more wireless devices in the network, ii) reading the update to determine one or more new, and/or modified, and/or deleted functions of said two or more devices which the update is programmed to implement, and iii) receiving an electronic update report reporting whether or not the software update was successfully installed in memory of said at least one wireless device; for each software update reported to be successfully installed in iii), comparing the new, and/or modified, and/or deleted functions determined in ii) against the properties detected in i) in order to establish which of the new functions are now enabled within the network, and/or which of the existing functions are now disabled within the network due to the update;
  creating a customized report indicating said enabled and/or disabled functions; and
  outputting the customized report to be output to a user via a user device of the user.

N.B. It will be appreciated that the numerals i-iii are just arbitrary labels and do not necessarily imply an order.

In embodiments, the one or more properties comprise one or more capabilities, settings and/or spatial configurations of the two or more wireless devices.

In embodiments, the one or more properties comprise at least the one or more capabilities, and the detecting of the capabilities comprises detecting a model ID of each of the two or more wireless devices and looking up which capabilities are mapped to each of the IDs in a capabilities database.

Alternatively for example each of the two or more devices may report a list of their capabilities to the central network element.

By whatever means detected, the capabilities may comprise which physical features the device is equipped with, e.g. what type(s) of input and/or transducer(s) it is equipped with, and/or what power output it is capable of, etc.

In embodiments, the comparing comprises determining that at least one of the new features is not supported by the determined capabilities and the report reporting that the at least one new feature is not enabled.

In embodiments, the one or more properties comprise at least the one or more settings, wherein said comparing comprises determine that at least one setting has been set to configure at least one of the now deleted functions and the report reporting that said at least one deleted function has been disabled.

In embodiments the one or more properties may comprise at least the spatial configuration, i.e. information on their orientation and/or spatial positions; for instance what direction the devices are facing in, their spacing relative to one another or their density. This could be absolute within the premises (e.g. based on a premises plan or map), or relative to one another. The spatial configuration may be detected for example using a localization system and/or an orientation sensor or sensors, or by looking up the spatial configuration in a commissioning database. The comparison may comprise determining that the spatial configuration of the two or more devices is not capable of delivering at least one of the new functions, said report reporting that the at least one new function is not enabled.

In embodiments, the at least one device to which the update is applied comprises a bridge for bridging between a first wireless protocol used by the user device to connect to the bridge and a second wireless protocol used by the bridge to connect to other, target ones of the wireless devices including at least said two or more devices; at least one of the existing, new and/or deleted functions comprising a function invokable by a command initiated by the user through the user device, transmitted from the user device to the bridge using the first wireless access technology, and forwarded from the bridge to the target devices using the second wireless access technology.

In embodiments, the centralized network element is the bridge.

In embodiments, the centralized network element is a server comprising one or more server units at one or more geographic sites, the server connecting to said network via the Internet and a wireless gateway between the Internet and said network.

In embodiments, the centralized network element is the user device.

In embodiments, the network comprises a lighting network, and at least some of said plurality of wireless devices are illumination devices.

In the case where the network comprises said bridge, then at least some of the target devices may be illumination devices (luminaires or individual illumination sources, e.g. taking the form of light "bulbs").

In embodiments, the new functions may comprise a lighting scene comprising a respective light output to be rendered by each of a set of the lighting devices; wherein the data on the capabilities comprises data on a light rendering capability of each of the illumination devices, wherein not all are able to render the respective light output; and wherein said establishing comprises establishing that the lighting scene cannot be fully rendered and the report indicates that the lighting scene cannot be fully rendered. E.g. certain illumination devices may not be able to render certain colours and/or dynamic effects, or may not be able to achieve certain power output, etc.

In alternative or additional applications of the disclosed techniques, at least some of the wireless devices may take the form of home appliances selected from the list: washing machine, tumble dryer, dishwasher, cooker, heating unit, air-conditioning unit, fan, ventilation unit. When such devices are integrated, the features/capabilities from a plurality of devices might be combined advantageously; e.g. when a networked washing machine can share its status, a nearby networked lighting unit might be useable to signal this status to nearby users in a more conspicuous manner.

In embodiments, the method comprises determining one or more potential solutions to enable the one or more disabled functions and wherein the customized report indicates said one or more determined potential solutions.

For example the one or more solutions may comprise one or more of: suggested additional hardware not currently within the network; suggested uninstall and reinstallation of the software update; suggested additional software updates to further wireless devices of the network which were not included in the software update; and/or suggested changes to one or more of the settings, e.g. to restore a previous function.

In embodiments the report may comprise a link to a website where the user can purchase the additional hardware.

In embodiments the update report may comprises information on whether the update was successful, unsuccessful or partially successful, and wherein if partially successful comprises details of which parts of the update were unsuccessful.

In embodiments, the method comprises wirelessly delivering said update to said at least one wireless device in order to cause the software update to be installed thereon.

In embodiments, each of the two or more wireless devices comprises neither a display screen nor a voice interface.

In embodiments the two or more wireless devices may comprise no user interface at all.

In embodiments the report accumulates the effect of multiple updates on multiple occasions, indicating a net effect of the multiple updates.

In embodiments the update or updates was/were not initiated by the user. In embodiments the centralized network element pushes the report to the user device despite not being requested by the user.

According to another aspect disclosed herein, there is provided a computer program product embodied on computer readable storage or downloadable from a communication network and configured so as when run on the centralized network element to perform the method in accordance with any of the disclosed embodiments.

According to another aspect disclosed herein there is provided a centralized network element for use in a network of wireless devices, the centralized network element comprising:

storage storing code; and
one or more processors arranged to run the code, the code being configured so as when thus run to perform operations of:
i) detecting one or more properties of the two or more wireless devices in the network, ii) reading the update to determine one or more new, and/or modified, and/or deleted functions of said two or more devices which the updated is programmed to implement, and iii) receiving an electronic update report reporting whether or not the software update was successfully installed in memory of said at least one wireless device;

for each software update reported to be successfully installed in iii), comparing the new, and/or modified, and/or deleted functions determined in ii) against the properties detected in i) in order to establish which of the new and/or modified functions are now enabled within the network, and/or which of the existing functions are now disabled within the network due to the update;

creating a customized report indicating said enabled and/or disabled functions; and outputting the customized report to be output to a user via a user device of the user.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
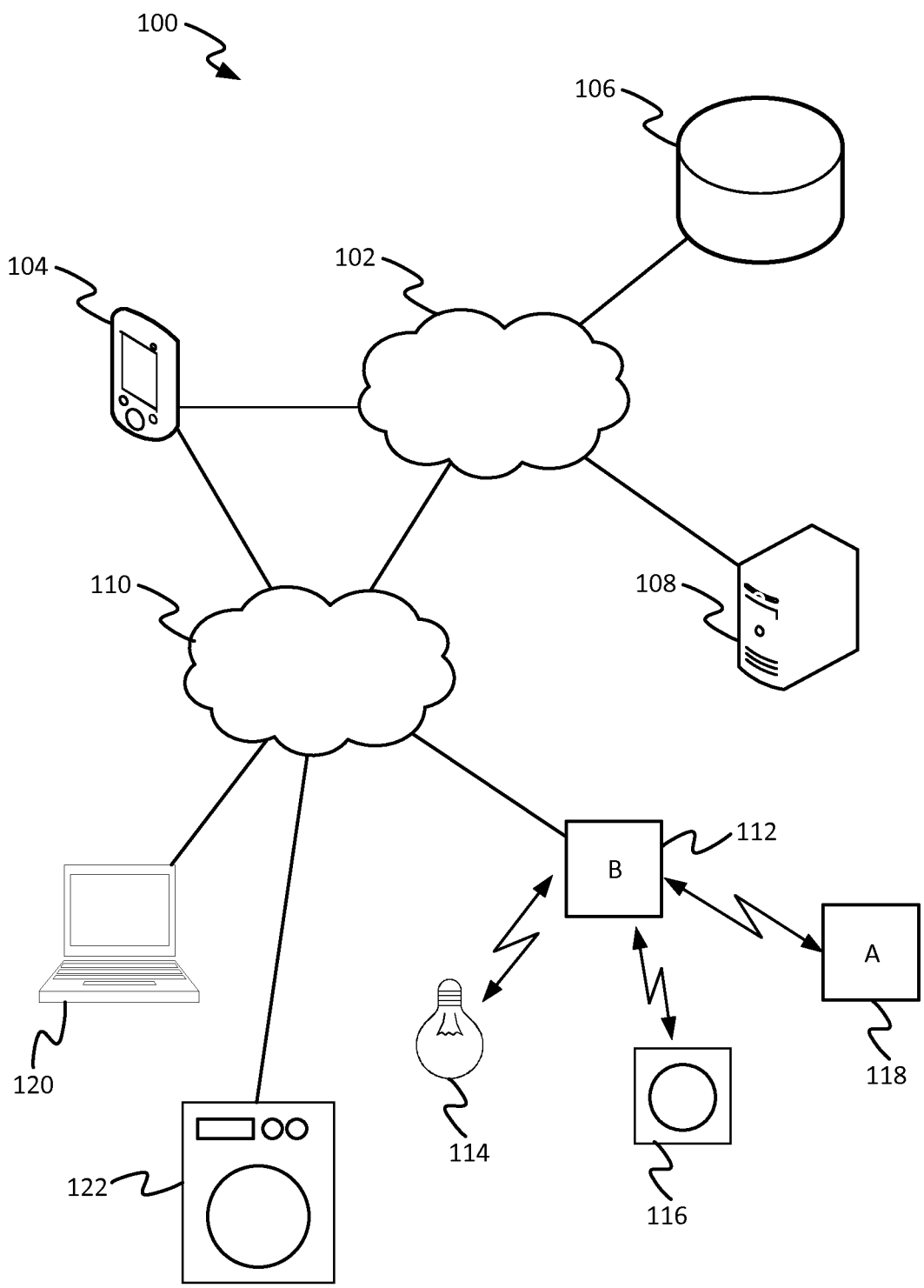
FIG. 1 shows schematically a network comprising a plurality of wireless devices.

Internet of Things (IoT) wireless devices often do not have a suitable type of display or substantially sized display for communicating large amounts of information to users, or indeed may not have any display at all. An example of when such a wireless device may need to communicate information to a user is after a software update. In these cases, the user may not be provided with much information, if any, when the wireless IoT device receives a software update. For example, not a lot of information may be provided about whether the software update has changed any functions of the IoT device or the existing network setup. Similarly information about new functions the network or wireless device has gained as a result of the software update may not be adequately communicated in order for the user to make use of these new or modified functions. Typically, if information is communicated to a user after a software update, users will receive only generalised version release notes about the newly installed software. Such general release notes may state only facts about the content or objectives of the update itself, such as "device stability improvements and bug fixes", or "new and/or enhanced functions". These kinds of statements do not provide the user with much useful information upon which to base their use of the wireless device network, e.g. what the new functions are, or how they may use their network differently to achieve new or modified functions.

In another scenario, an existing function may no longer work after a software update. This may also be important for the user to be made aware of Typically a user may not find out that a function no longer works as they expect until they try to use it. For example, lighting system users will typically get a general release note (as described above) stating when new functions are added by a software update, e.g. in a software update for a bridge, but they will never be told whether this update has removed a function, or disrupted pre-set parameters of a function, e.g. if a lighting scene no longer displays correctly, or if the update changed the way their bridge works.

The present invention provides a method of reporting on a software update performed on such a network. The network comprises a plurality of wireless devices such as Internet of Things (IoT) devices. Before the update the network is installed with operating software on one or more of the plurality of wireless devices which enables one or more existing functions across the plurality of wireless devices. That is to say, one or more devices within the network have running on them some software which allows for certain functions to be carried out across the devices of the network. The update performed is applied to the operating software of at least one of the wireless devices, and as a result the operation of two or more of the wireless devices within the network is affected. A central element of the network (e.g. server, bridge, or mobile user device) is utilized to detect one or more properties of the two or more wireless devices in the network which have been affected by the software update. The central network element may also read the update which has been performed in order to determine any new, modified, or deleted functions of the affected devices to be implemented by the update as programmed. The central network element may then receive an electronic update report. This report details whether or not the particular software update performed was successfully installed in memory of the at least one wireless device on which it is to run. That is to say, it is reported whether the software update worked in a sense that the programmed changes resulting from the update will actually occur when the one or more devices run the updated software. The central network element may then compare, for each successful software update, any new, modified, or deleted functions determined against the properties detected of the devices, and establish which of the new functions are now enabled, and which of the existing functions are now disabled or modified due to the software update. Thus, the central network element may establish a number of functions which are now available for use by the user, and any existing functions (pre-programed by the user or otherwise), which have been changed by the update. This change may be one that stops the function from operating altogether, or simply changes it in some way, either for the better or for the worse. The central network element may then create a customized report for the user. The report indicates which functions have been enabled (or modified), or disabled as a result of the software update. The report may be considered customized as it is generated in response to specific information relevant to the user and the specific network as used by the user. The customized report may then be output to a user device of the user.

Thus the user is provided with more information than typically provided in general release notes with regard to changes as a result of the update. For example, typically general release notes would not inform the user if the update caused any problems to their IoT devices. The general release notes would also not inform the user in detail as to what a new feature might be, e.g. the lights in the living room are now dimmable, and may only say 'new functions added to lights MO298765'. Thus conventionally, discovering the new features, or that an old feature no longer works in the same way, is up to the user to find out on their own, either by accident or by consulting some other source. The user may also need to take some actions to fix an altered feature as a result of the update. Advice on such actions is provided by the customized report of the presently described techniques.

FIG. 1 shows an example system 100 according to embodiments of the present invention. The system 100 comprises a back-end network 102, a back-end memory 106, a back-end server 108, a mobile user device 104, wireless network 110, and a plurality of wireless devices 112-122.

The Internet of Things is a network of physical devices, vehicles, home appliances, and other items, each embedded with electronics, software, one or more sensors and/or actuators, and connectivity which enables these items to make connections and exchange data. In the system of FIG. 1, the wireless network 110 may be a local network such as a home network, connected to which are a plurality of wireless devices 112-122. These wireless devices may be referred to as IoT devices and may in turn form part of the local network 110 when connected thereto. These IoT devices 112-122 may therefore also represent the IoT. The plurality of wireless devices 112-122 comprises at least two wireless devices.

The local network 110 may also be connected to the back-end network 102. The first network 102 may be a wide area network (WAN) such as the internet, or another intermediary network through which access to the internet may be achieved. The first network 102 may be e.g. the Internet, or any other network through which digital information and data may be sent. Either way, the first network 102 may comprise a cloud platform implementing a back end system 106, 108.

Each of the plurality of devices 112-122 may connect directly to the local network 110, or via another of the plurality of wireless devices 112-122. As the local network 110 may be connected to the back-end network 102, each of the plurality of wireless devices may be connected to the back-end network 102, e.g. the internet, via the local network 110. The plurality of wireless devices 112-122 may connect to the back-end network 102 via a companion application located on the mobile user device 104. The mobile user device 104 may connect to the local network 110, and to the back-end network 102 via said connection with the local network 110. The mobile user device 104 may also connect to the back-end network 102 independently of the local network 110. That is to say, the mobile device 104 may be connected to network 102 (directly or indirectly), such that data may be received over network 102, and subsequently transmitted to one or more of the plurality of devices 112-122 via the local network 110. This data may comprise any data for consumption by or at one or more of the plurality of wireless devices 112-122, for example, data such as media data, text files, control signals, or software including updates. That is to say the network 110 may be, for example, a local or home network to which Internet of Things wireless devices may be connected, and through which controlled.

Companion applications are applications which run on a processor of a user device, for example a mobile user device such as a smartphone, a PDA, a computer, etc. The companion application is often used as a means of controlling certain functions of the wireless IoT device to which the companion application belongs. For example, some Bluetooth headphones require a companion application to run on the system of the device which they are desired to be connected to. That is, a mobile user device must download and install the companion app before the Bluetooth headphones will successfully pair with the mobile user device. Companion applications may be used for reasons of compatibility, security, or due to limited processing power for running specific operations on the wireless IoT device being controlled. Companion applications are very often used to control IoT wireless devices as many IoT devices do not have displays or user interfaces of their own through which they can receive such inputs. Also some IoT devices, when in use, are physically inaccessible to the user, e.g. lighting on a ceiling, air-conditioning units, sound systems, etc. Thus companion applications present on mobile user devices are used to provide such user inputs. Companion applications can also be used to provide software and software updates, the software being downloaded from a back-end memory 106 by the mobile user device 104 via the back-end network 102 (or from a local solid state memory such as a CD), and then transferred (e.g. via network 110) to the wireless IoT device(s) 112-122. This can provide a level of security for the wireless IoT device, and peace of mind for the user or owner with regard to maintaining control of their personal devices.

The wireless IoT devices 112-122, mobile user device 104, and network 110 are connected to external data and services such as the back-end memory 106 and back-end server 108, via the back-end network 102 (e.g. internet). Note that the wireless connections between the user device 104 and the wireless IoT devices 112-122 are shown in FIG. 1 as direct connections via local network 110, but it is understood that the user device 104 may also connect to the wireless IoT devices 112-122 via the back-end network 102 (e.g. the internet). The back-end memory 106 may be distributed throughout a back-end 108 of the system on one or more computers, in one or more physical locations. The back-end server 108 may be located on one or more servers 108 of network 102, and memory 106 may be similarly distributed, in one or more physical locations, as software, hardware, or any combination thereof, and connected through the back-end network 102. The back-end memory 106 may be part of the back-end server 108 or one or more separate storage devices, or a combination.

Each of the wireless devices 112-122 may be any device capable of connecting wirelessly to the network 110 and/or network 102 such that they may be controlled or communicated with via a suitable control device, for example the mobile user device 104. Example wireless devices which typically have connection capabilities (such that they may form part of an IoT network), include: computing devices 120 (e.g. desktop or laptop computers in the home); home appliances such as white goods 122 (e.g. washing machines or dishwashers); lighting devices 114 (including whole fixtures or individual illumination sources such as lightbulbs) and other lighting system components such as light switches or presence sensors 116 and base stations or bridges 112 of such connected lighting networks, etc.; security systems; thermostats and associated heating devices, air-conditioners and other ventilation systems (HVAC devices); and entertainment systems (e.g. sound systems comprising speakers etc., and media systems comprising display screens, projectors, media players and recorders, etc.). Existing home networks for accessing the internet may be leveraged to form part of the IoT network in a user's home, and may form the connectivity backbone of the network.

It should be noted that there is not a restriction to a single wireless communication protocol within the IoT network 110. For example as shown in FIG. 1, there may be a connected lighting network within the IoT network 110. This sub-network may use a first protocol within itself to communicate with the individual lights, sensors, switches or actuators (114-118) in the lighting network, and the rest of the IoT network may communicate wirelessly using a second protocol. Control signals and data may be transmitted between the two networks and protocols, for example by the use of a bridge device 112 within the connected lighting network. The bridge 112 may act to translate control signals and other data from the first protocol to the second different protocol. However, it may also be that no such second protocol is used within the network 110.

As an example, each luminaire 114 in the network may be configured according to one communication protocol, such as ZigBee, and the light switches 116 may be configured according to another communication protocol, such as WiFi. Hence, it is appreciated that the luminaires may communicate with each other and the lighting bridge 112 without relaying data through a switch, and the switch may communicate directly with the lighting bridge 112. In any case, it is understood that the lighting bridge 112 is able to communicate, by whatever appropriate means, with each other device in the lighting network.

Within the lighting network "chaining" connections may be implemented, as in a ZigBee lighting network, wherein it is not necessary for each device to be directly connected to each other device or the bridge. Instead, devices are able to relay communication signals which allows for, for example, a first luminaire 114 to communicate with the lighting bridge 112 by relaying data through a second and third luminaire 114 to the lighting bridge 112. However, it is not excluded that other network topologies may be employed. For example, a "hub-and-spoke" topology may be used in which each device is directly connected (e.g. wirelessly) to the lighting bridge 112 and not to any other devices in the network.

Turning to the wireless devices of FIG. 1, each lighting device (luminaire or individual illumination source) 114 is configured to provide illumination to illuminate an environment such as a room. The luminaire 114 may be a ceiling type luminaire or a free-standing lamp type luminaire placed on a table. There may be one or more luminaires or illumination sources 116 within the network 110. They may be connected together to form a sub-network as shown in FIG. 1, or distributed within the network 110 and individually connected to a hub element of the wireless network 110. Each of the luminaire(s) 114 may be any suitable type of luminaire such as an incandescent light, a fluorescent light, an LED lighting device etc. In the case of a plurality of luminaires 114, these may comprise more than one type of luminaire, or each luminaire 114 may be of the same type. Each luminaire 114 takes the form of a lighting unit with individual light sources (e.g. "bulbs") located inside the lighting unit. The lighting unit may also house one or more sensors 116, or such sensors could be located externally elsewhere within the wireless network 110. These sensors may be luminance sensors, occupancy sensors, or any other kind of sensor suitable for collecting data that may provide information on the connected lighting system and how it functions.

It is noted that the terms "luminaire", "light source" and "illumination source" are used herein to refer to a device which emits not just any light, but specifically illumination, i.e. light on a scale suitable for contributing to the illuminating of an environment occupied by one or more humans (so that the human occupants can see within the physical space as a consequence). Note also that the term "lighting" also refers to illumination in this sense.

The connected lighting network may comprise one or more luminaires 114, one or more lighting bridges 112, one or more sensors 116, one or more light switches, light controls and/or other actuators 118. That is, they may all be interconnected by wireless connections, indicated by jagged lines in FIG. 1.

The actuator 118 may be any actuator configured to move or control a mechanism in response to an electrical control signal. For example, an actuator may be part of a window treatment system, such as blinds or curtains, which control the amount of natural day-light. In another example of an IoT system, such as a smart car, a software update might change the behavior of an actuator of the breaking system. For example, the actuator might control the compression of the breaking fluid by controlling a piston in the breaking system.

The lighting bridge 112 is arranged at least to receive input (e.g. from the back-end server 108, or user device 104) and based thereon to send lighting control commands to luminaires 114. It should be understood that control logic may be stored elsewhere in the connected lighting system, i.e. a system back-end or cloud platform, and not necessarily within the bridge 112. It should also be understood that any communication interface that allows the lighting system devices to connect to networks such as network 102 are not necessarily comprised within the same housing as the lighting bridge 112.

The lighting bridge 112 may also be provided with a connection to the back-end network 102. This network 102 may be a wide area network (WAN) such the internet, or another intermediary network 110 through which access to the internet may be achieved as shown in FIG. 1. This connection, as known in the art, allows the lighting bridge 112 to connect to one or more back-end networks 102 like the internet and any external data and services such as back-end memory 106 and server 108. Note that the wireless connection between user device 104 and the lighting bridge 112 is not shown in FIG. 1 as a direct connection, but it is understood that the user device 104 may also connect directly to the lighting bridge 112.

The sensor 116 can be either part of a unit comprising a luminaire 114, or a standalone sensor. There may be one or more of such sensors 116 within the connected lighting sub-network, or the local or wireless network 110 more generally. The standalone sensor 116 in FIG. 1 is part of the lighting sub-network in that it is arranged to communicate within the sub-network via a wired or wireless connection. That is, the sensor 116 is arranged to at least be operatively coupled to the lighting bridge 112 in the same way the luminaire 114 is. The sensor 116 may be any suitable form of sensor for detecting a property within an environment which can be used to gather lighting-related data. For example, the sensor 116 may be a microphone arranged to detect noise within the environment and subsequently determine occupancy values. The sensor 116 may also be a motion detector, a camera, a thermal sensor, and/or a light or luminosity sensor. Although shown in FIG. 1 as a single entity, it is understood that any suitable sensor or plurality of sensors may be used to provide the functionality ascribed herein to the sensor 116.

Given the above description, it is appreciated that the connected lighting network shown in FIG. 1 is arranged to function as a connected system, and therefore that one or more of luminaire 114 may be configured to behave according to one or more automation rules. For example, the bridge 112 may be configured to control the luminaire 114 (or a plurality of such luminaires) to respond to certain ambient lighting conditions sensed by the sensor 116 (or a plurality of such sensors), in a way that provides a combined total lighting effect or scene. That is to say, depending on the sensed intensity of light at sensor 116, the dim of any of luminaire(s) 114 may be adjusted automatically to achieve a pre-defined desired luminosity for an environment. This pre-defined setting may be stored locally (for example on the bridge 112, in the wireless network 110, or on mobile device 104), or remotely at database 106 and accessed via networks 110 and 102, and implemented by bridge 112 accordingly.

FIG. 1 also shows a user device 104 such as a smart phone. The user device 104 may be operatively connected to each of the plurality of wireless devices 112-122 within the IoT network 110. The connection may be directly, via network 110, or by way of a sub-network like the connected lighting network of FIG. 1. The used device 104 may then be used by a user to input commands to any of the plurality of wireless devices 112-122 contained within the IoT network 110.

For example, the user device 104 may be operatively coupled to the lighting bridge 112 by a wireless connection (e.g. WiFi or ZigBee) and hence control the lighting sub-network (which may be connected to the bridge 112 by a wired or wireless series of connections). Input can be provided to the lighting bridge 112 via the user device 104 using, for example, a graphical user interface of the user device 104. The lighting bridge 112 may then interpret the input and send control commands to the luminaire(s) 114 accordingly. The user device 104 generally allows for more complex control than a switch within the wireless network 110. For example, a user may use the user device 104 to dim or change the colour of an individual luminaire or a plurality of luminaires. The same user device 104 may also be used to control other devices within the IoT network 110, e.g. white goods 122. Control signals and instructions may be provided to any one or more of the plurality of wireless devices 112-122. These controls may be provided via a companion application running on the mobile user device 104.

Additionally or alternatively, the user may use the user device 104 to control a wireless device (such as a luminaire) in a different environment to the user. For example, this may comprise controlling a luminaire in a different room to the room in which the user and user device 104 are currently located. This remote operation may extend via the back-end or wide-area network 102 to other more remote locations, such as another building, geographical region, or in some cases even another country. This is particularly advantageous because the user device 104 is generally more portable than a simple switch which forms part of network 110 (particularly a wall-mounted switch), and hence may be used at many different physical locations. The user device 104 may be used to control a plurality of the wireless devices at once, e.g. controlling a plurality of luminaire(s) 114 to render a lighting scene by the user selecting the lighting scene and desired luminaires using a GUI of the user device 104.

The software update may, in embodiments, be applied to the bridge 112. That is to say, the at least one device to which the update is applied comprises a bridge 112. The bridge 112 may be used for bridging between a first wireless protocol used by the user device to connect to the bridge and a second wireless protocol used by the bridge 112 to connect to other, target ones of the wireless devices 114-118, including at least said two or more devices. At least one of the existing, new, modified, and/or deleted functions may comprise a function invokable by a command initiated by the user through the user device 104, transmitted from the user device to the bridge 112 using the first wireless access technology (for example WiFi or Bluetooth Low Energy, BLE), and forwarded from the bridge 112 to the target devices 114-118 using the second wireless protocol (for example ZigBee).

The back-end memory (storage) 106 may be used to store data associated with the IoT network 110. This data may comprise automated rules to be carried out by devices of the network 110, it may comprise information collected about the use of the wireless devices 112-122 of the network 110, it may comprise information about the running of the wireless devices, and/or information about the devices themselves such as model numbers and software versions being run thereon. The memory 106 may be distributed throughout a back-end of the system on one or more computers (e.g. server units or dedicated storage devices), in one or more physical locations. It should be understood that some of the data described as being held in memory 106 may be duplicated or alternatively stored on memory of another system element, for example the mobile user device 104, a central element of the network 110 such as a hub or bridge 112, or the wireless devices 112-122 themselves.

The back-end server 108 is configured to control and/or run aspects of the system 100 such as software update schedules, data collection and storage, execution of commands, and other services and processes which require back-end system participation.

The system back-end may be located on one or more server units 108 of the back-end network 102, in one or more physical locations, as software, hardware, or any combination thereof, and connected through network 102.

Figure 2:
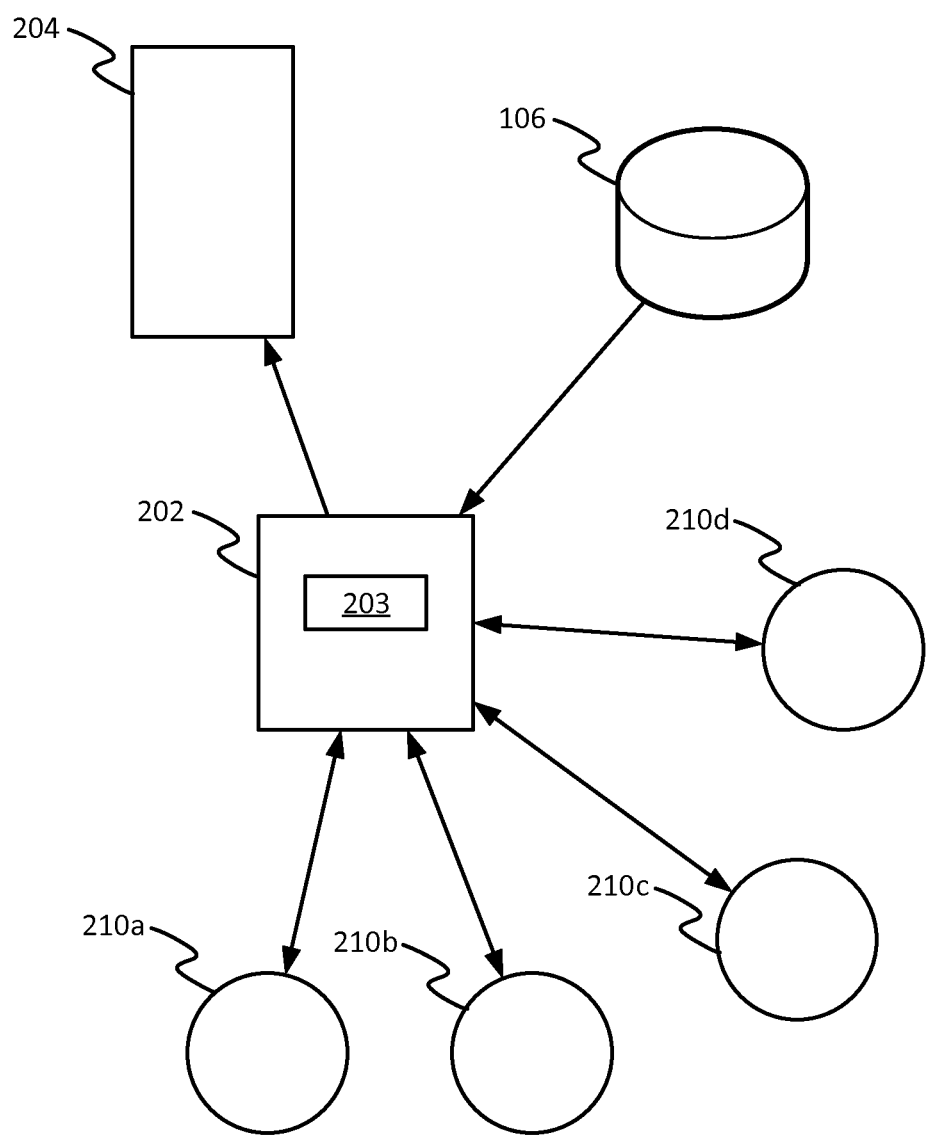
FIG. 2 shows schematically another illustration of a network comprising a plurality of wireless devices.

Turning to FIG. 2, there is shown a schematic diagram of the system 100, comprising memory 106, a user interface 204 of the mobile used device 104, a plurality of wireless devices 210a-d, and a central element 202. The wireless devices 210a-d may be, for example, any combination of the wireless devices 112-122 connected to network 110 of FIG. 1. It should be noted that the types of wireless devices 210a-d are not limited to any specific type of wireless device, and similarly are not limited to those types of device depicted in FIG. 1.

The centralized network element 202 may comprise one or more mobile user devices 104, one or more server units 108 of the system, or one or more of the plurality of wireless devices themselves. For example, the centralized network element 202 may be the bridge 112 as shown in FIG. 1. The bridge acts as a localized intelligence, resulting in better privacy, and demanding less computation power from the back-end.

In an alternative embodiment, the centralized network element may be a computing device such as the user device 104 of FIG. 1. The use of a mobile app at a user device provides sufficient processing power and storage, as well as providing good communication potential with the user.

In further alternative embodiments, the centralized network element 202 may be the server 108 of FIG. 1. The server 108 may comprise one or more server units at one or more geographic sites. The server may be connected to the wireless network 110 via the back-end network 102 (e.g. internet) and a wireless gateway between the back-end network 102 and the wireless network 110. The merits of using a cloud platform are significant processing power which makes the back-end servers suited for centralized control.

The centralized network element 202 comprises an update report manager 203. This may take the form of software stored on storage of the centralized network element 202 and arranged to run on one or more processors of the centralized network element 202. Alternatively an implementation partly or wholly in dedicated hardware circuitry is not excluded.

The update report manager 203 is configured to control the centralized network element 202, as explained above, to i) detect one or more properties of two or more of the wireless devices 112-122; ii) determine the intended functions to be enabled and disabled by the software update; iii) determine whether the updates were actually installed on each of the devices 112-122 in question; and iv) based on this information, create a report identifying any functions which may or may not be used.

The one or more properties of the plurality of wireless devices 112-122 determined in step i) may comprise, for example: one or more capabilities, settings, or spatial configurations of the two or more wireless devices.

The capabilities of the wireless devices 112-122 may comprise which physical features the device is equipped with, e.g. what type(s) of input and/or transducer(s) it is equipped with, or what power output it is capable of, etc. For instance, the capability information may comprise whether a lighting device 114 is capable of outputting infrared illumination, colour illumination or a specific colour; or whether its light output light is capable of being dimmed. As another example, the capability information may comprise whether a washing machine 122 also comprises drying functionalities or a certain spin cycle, or whether an entertainment system can be synched with the local lighting system. It should be understood that these examples of capabilities do not represent the entire range of possible capabilities that the report manger 203 on the centralized network element 202 may be able to determine about the wireless devices. There are many other capabilities of wireless devices 112-122 within the network 110 which may be determinable.

The capabilities may also be determined in a number of ways. For example, the report manager 203 on the centralized network element 202 may be provided with the model numbers of the wireless devices 112-122. That is to say the detecting of the capabilities may comprise detecting a model ID of each of the two or more wireless devices and looking up which capabilities are mapped to each of the IDs in a capabilities database. The model ID may be provided to the centralized network element 202 in multiple ways. For example, the user may enter this information on request (e.g. via a user interface 204 of the user device), or upon initial setting up of the device within the wireless network 110. Alternatively the model number may be pre-stored. The model number information or identifier may be obtained from a database, either on memory locally within the wireless network 110 (for example on storage of the centralized network element itself, storage of the user device, or storage of another network 110 element or wireless device), or within the backend system memory 106 (which may be distributed across one or more geographical locations).

Additionally or alternatively the model number information or ID may be obtained by the update report manager 203 querying the one or more wireless devices 112-122. In response to such a query, one or more wireless devices 112-122 may individually return their respective model number ID to the report manager 203 on the centralized network element 202.

In response to knowing (from previously entered data in an accessible memory) or obtaining (via a query) a model number or model ID of the two or more wireless devices, the update report manager 203 may request capabilities information (e.g. specification information) for that particular model of that type of wireless device. The capabilities information may be requested from a capabilities database, e.g. in the back-end memory 106. Thus the capabilities information may be obtained from a backend memory of the system, or downloaded from a third party online source, and delivered to the centralized network element 202 accordingly. The capabilities information may list the features of the wireless device(s). In this way the centralized network element may be informed about the wireless device's ability to provide certain functions within the network 110.

Alternatively for example, each of one, some or all of the wireless devices 112-122 may report an explicit list of their capabilities to the report manger 203 on the central network element 202. This list may identify the capabilities using a schema common to the network element 202 and wireless device(s) 112-122 for specifying capability types.

By whatever means identified, the update report manager 203 also checks which of the updates were successfully installed in each of the wireless devices in question ("successfully" in the sense that the update was actually installed, but not necessarily in the sense that it had an intended effect). E.g. this may comprise receiving an individual report back from each of the wireless devices 112-122 via the wireless network 110. The update report manager 203 then compares the identified capabilities with the intended functionality that the installed software updates were programmed to implement. As a result the, the comparing by the update report manager 203 may comprise determining that at least one of the new functions is not supported by the determined capabilities. The update report manager 203 then generates a report based on this comparison and makes the report available to the user, for instance via the user device 104 (e.g. through the companion application run on that device). Based on the comparison, the resulting report may for example report that the at least one (intended) new function is not in fact enabled. That is to say that, because of the capabilities of the wireless device 112-122, some functions enabled by the software update itself may not be enabled. E.g. this may be due to the lack of one or more physical features of one or more of the wireless devices as required to carry out that particular function.

The system may make use of device descriptions, wherein capabilities are attributed to individual devices, and wherein furthermore requirements are provided that describe preconditions that need to be satisfied for a particular device to operate, or for a particular capability to be enabled.

Example Lamp Capabilities
- Capable of operating using Zigbee 3.0
- Capable of operating using BLE
- Capable of handling color set commands
- Capable of handling dimming commands V1
- Capable of handling dimming commands V2
- Capable of handling deep dimming commands
- Capable of handling RGB control information
- Capable of handling power cycle commands
- Capable of handling time-based commands
- Capable of storing simple schedule (single on/off times)
- Capable of extracting addressed content from light scripts
- Capable of handling short addressed scripts (<1 Kbyte)
- Capable of handling long addressed scripts (1 Kbyte-5 Kbyte)
- Capable of handling Signify proprietary commands V1

Example Lamp Requirements
- Requires compatible radio connection
- Requires external controller for commands
- Requires configuration of spatial position for spatial scripting As indicated the list of capabilities may indicate that a lamp is capable of accepting commands from both a Zigbee mesh and/or from a mobile phone directly over BLE. When a user is only used to being able to control lamps through the bridge this direct control feature may be relevant and enable new applications, it will however require both the lamp and controller to support this feature. The capabilities may also list whether or not a device can handle different command versions. It may list whether the devices in question support proprietary commands sets, or standardized command sets. By parsing the capabilities of multiple interacting devices and the requirements thereof and evaluating them for the system, it can be determined which particular capabilities are enabled by an update in the system, in particular when such new capabilities result from the interaction of two or more devices.

Capabilities and requirements of other actors in the system such as a bridge device, a controller device and/or a sensor device may be described in a like manner.

Example Controller Capabilities
  Capable of operating using Zigbee 3.0
  Capable of operating using BLE
  Capable of sending color set commands
  Capable of sending dimming colored
  Capable of sending deep dimming
  Capable of sending RGB control information V1
  Capable of sending RGB control information V2
  Capable of sending power cycle commands
  Capable of sending time-based commands
  Capable of sending simple schedule (single on/off times)
  Capable of sending addressed content from light scripts
  Capable of sending short addressed scripts (<1 Kbyte)
  Capable of sending long addressed scripts (1 Kbyte-5 Kbyte)
  Capable of relaying IFTTT commands
  Capable of processing simple command transmission scripts
  Capable of relaying simple command transmission scripts Example Controller Requirements
  Requires connection to the bridge
  Requires connection to the cloud
  Presence of a configured lamp Although capabilities and requirements can be attached on the device level, quite often requirements will be related to a particular capability. Therefore, it may be particularly advantageous if requirements are attributed to device capabilities resulting in capability-requirement combinations. For example, for a controller the capability of "relaying IFTTT commands", may require "a connection to the cloud", "a connection to the bridge" and "presence of a configured lamp". Such requirements can be captured in a description, that may be machine readable only, or may even be provided in a human readable form. It will be clear to those skilled in the art that the above merely represents an example of how capabilities and requirements can be attributed to devices, which in turn may be used to assess capabilities of the system.

Pre- and post-update evaluations of system capabilities are preferably used to assess the differences in system behaviour that result from updates in the system. The present invention in particular can flag changes in capabilities that result from the interaction between two devices in the system.

In alternative or additional embodiments, the one or more properties of the wireless devices 112-122, which the update report manager 203 on the centralized element 202 is configured to detect, may comprise at least one or more settings of the wireless devices 112-122. For example, settings imposed by a user to one or more of the wireless devices may influence which functions are useable within the network 110. For instance, the user may set up a specific lighting scene using one or more lights of the network 110. A software update may result in the scene no longer being rendered as previously set up by the user. Similarly, some wireless devices 112-122 may be configured or have settings which prevent them from functioning in a way that would enable a new or modified function as a result of the update from working. Thus, knowing such properties at the centralized network element 202 enables the update report manager 203 to consider these personal user imposed limitations when determining the functions which have been enabled or disabled as a result of the software update.

The settings may be detected by querying the wireless devices 112-122 for their current settings, or retrieving them from a memory recording the settings elsewhere. This memory may be the back-end memory 106, or a local memory of the network 110 (e.g. the bridge 112).

By considering the user settings imposed on the IoT network 110, it is also possible to deduce which functions the user was previously using. As a result of knowing this information it may be possible to alert the user if one or more specific functions which they have previously set to enable, or for which they have applied some specific settings, are no longer available. That is to say, the step of comparing comprises determining that at least one setting was set to configure at least one of the now deleted or disabled functions. The resulting report then reports that said at least one function is no longer available.

In further alternative or additional embodiments, the one or more properties in question may comprise at least spatial configuration information, i.e. information on the orientation and/or spatial positions of the wireless devices. For instance, this may comprise what direction the wireless devices 112-122 are facing in, their coordinates, their spacing relative to one another, and/or their spatial density within an environment. The spatial configuration may be detected for example using a localization system and/or an orientation sensor or sensors, or by looking up the spatial configuration in a commissioning database. The spatial configuration may comprise information from a map or floorplan which is capable of providing positions which are absolute within the premises concerned.

The comparison may comprise determining that the spatial configuration of the two or more devices is not capable of delivering at least one of the new or modified functions, e.g. a certain type of lighting scene. The resulting report reporting that the at least one new or modified function is not enabled. Similarly the comparison may determine that the spatial configuration is adequate in order to deliver at least one of the new or modified functions, and the report may then include the new or modified function in a list of enabled functions.

Therefore it can be seen that by considering the network specific information discussed above, comprising properties of the particular network 110 of the user, then personalized release notes can be created. That is to say a customized report on the functions the user can expect to be able to use in their own particular wireless device network may be provided.

The system may establish that after an update particular features are 'broken' in the following ways, which incorporate events which are usually part of any software update.

Known issues: the company releasing the software update might already know they are going to remove a function in the next software update and that any behaviour dependent on this function will fail. For example, a company removes a function from their body scales by releasing a new software update. A user might have set some settings on their app to use that function (e.g. send an alert to the doctor when I am not within a normal range), but as this function was removed, alerts will not be sent anymore. With the embodiments described herein, a user will know that a behaviour they set (e.g. notifying the doctor) will be disabled.

Scripts: after a software update, there may be one or more post-update scripts which run on the one or more wireless devices to check if the software update applied to the device is in the correct state or not. For example, the post-update scripts might find lighting scenes which have been affected. Using the information gathered by one or more scripts in the system and method described herein, the user will know that for example, the 'Spring Blossom' scene in the living room will no longer work.

Similarly when discussing how to establish when new or modified functions are enabled, certain attributes associated with updates may be checked comprise, for example as follows.

Model number: the same software update may be rolled out to all devices, but they may have little differences depending on their model. For example, the same software might be running on multiple models of a car from the same vendor. In another example, the same software may be used in model V1 and V2 lighting bridges. After an update to that software, users of model V1 bridges may receive generic release notes including "enabling entertainment features", even though these updates only apply to model V2 bridges. This can be avoided when the release notes are personalized to create a customized report.

Geographical Region: some services might not be available in some regions (for example due to media licensing, etc.). The back-end system may check if the IoT wireless device is eligible for this function, before showing anything related to its enablement in a customized report.

The customized report may also include marketing material. For example, when users receive a software update that will enable a particular entertainment feature; for example an update to software on bridge 112, but they don't have lights with the required capabilities, an extra line can be added to the report (release notes) indicating this to the user and helping the user to purchase the capable lights.

For example, instead of having a general note comprising "this update will allow you to use entertainment features", the customized report can comprise "with this update, your bridge is able to use entertainment features x, y, and z. However, you currently do not have any lights capable of this function in your network. You can purchase the necessary light for using this function from <here>"

As discussed above, the network 110 may comprise a lighting network (or sub-network), and at least some of said plurality of wireless devices may be illumination devices (luminaires or individual illumination sources, e.g. "lightbulbs"). The lighting network may connect to the rest of the wireless network 110 via the bridge element 112. In the case where the wireless network 110 comprises said bridge 112, then at least some of the target wireless devices 114 may be illumination devices.

In embodiments, the modified or new functions may comprise a lighting scene comprising a respective light output to be rendered by each of a set of the lighting devices. The data on the capabilities may therefore comprise data on a light rendering capability of each of the illumination devices in a lighting network. It may be determined that not all of the illumination devices are able to render the respective light output. In this case the establishing comprises establishing that the lighting scene cannot be fully rendered, and the subsequent customized report will indicate that the lighting scene cannot be fully rendered. Such capabilities may include, for example, an indication that certain illumination devices may not be able to render certain colours, certain dynamic effects, or may not be able to achieve certain power output, etc.

It should be understood that in alternative or additional applications of the disclosed techniques, at least some of the wireless devices may take the form of home appliances 122. These home appliances may be selected from the list: washing machine, tumble dryer, dishwasher, cooker, heating unit, air-conditioning unit, fan, or ventilation unit. When such devices are integrated, the features or capabilities from a plurality of devices might be combined advantageously; e.g. when a networked washing machine can share its status, a nearby networked lighting unit might be useable to signal this status to nearby users in a more conspicuous manner.

Figure 3A:
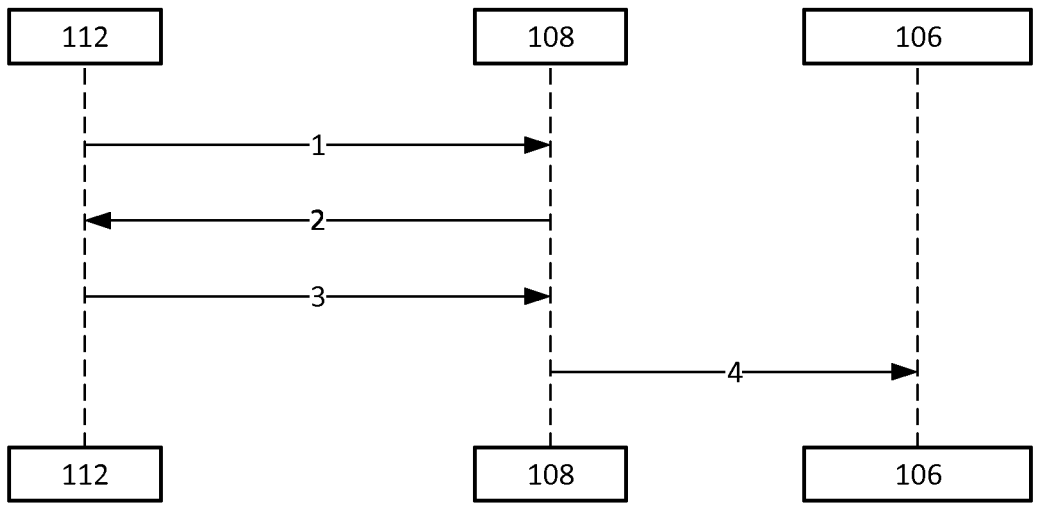
FIG. 3a shows a schematic signalling chart of a method of reporting on updates.
Figure 3B:
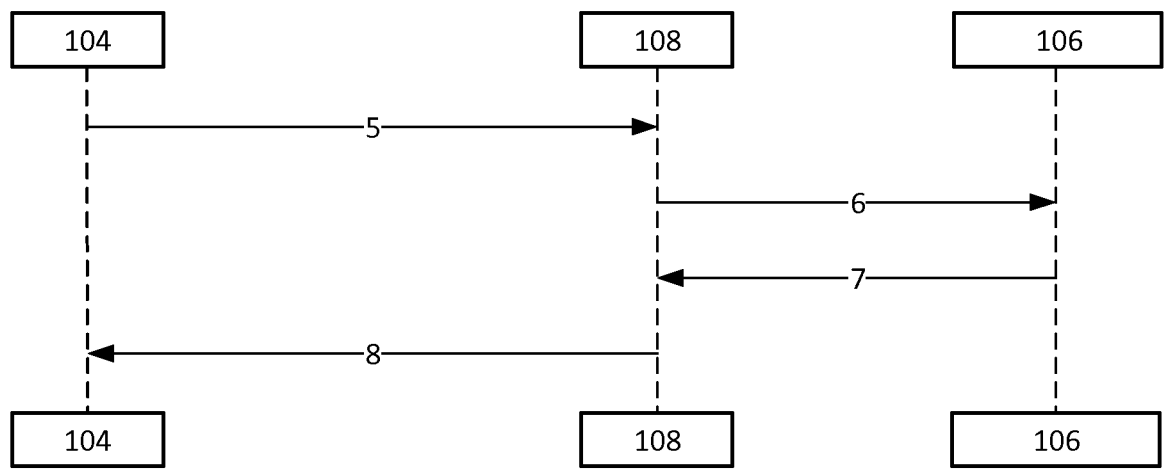
FIG. 3b shows another schematic signalling chart of a method of reporting on updates.

Turning to FIGS. 3*a* and 3*b*, there is depicted an example implementation of the disclosed technique. In this example the applied update is a software update package to be applied to the bridge 112 element of the wireless network 110 as shown in FIG. 1. A cloud server 108 acts as the centralized network element 202 in this example embodiment. However, it should be understood that the same or similar processes, with regard to the types of messages and requests show in FIG. 3, would be equally applicable should another one or more alternative network element(s) act as the centralized network element for the purposes of gathering the required information and creating and transmitting the customized report.

FIG. 3*a* shows a bridge 112, backend server or cloud platform 108, and memory or diagnostics database 106. The bridge 112 sends a first message 1 to the backend server or cloud platform 108 requesting a software update. This may be a query to determine whether a software update is available. In response the cloud 108 may deliver a software update package 2. The update package 2, once received by the bridge 112, is applied to the bridge 112 of the wireless network 110. Once applied to the bridge 112, the software update success or failure is reported 3 to the cloud 108 as part of a diagnostics or update report. The diagnostic report forms part of a log, the log is then stored 4 at the diagnostics database 106.

FIG. 3*b* shows a user device 104, the backend server 108, and the diagnostics database 106. The user device 104 may request 5 release notes for the software update to a particular bridge 112 (e.g. the bridge of FIG. 3*a* having had a software update applied thereto). The cloud platform 108 may then request 6 the diagnostics log for the bridge 112 from the diagnostics database at memory 106. The diagnostics log for bridge 112 is then retrieved by the cloud platform 108, or delivered 7 by the diagnostics database 106 in response to the request 6 from the cloud platform 108. The cloud platform 108 (backend server 108), behaves in this example implementation as the centralized network element. Therefore, it is at the back end 108 that the detecting of properties of the two or more wireless devices, reading of the update to determine new, modified, or deleted functions, receiving the update report or diagnostic log reporting the whether the update was successful or not, and ultimately comparing this information in order to establish which new or modified functions are now enabled, or which existing functions are now disabled. This information is then used to create the customised report, also at the back end 108 in this example.

The customized report, which may include the generic software release notes as well as the personalized, network specific, report on enabled and disabled functions, is then delivered 8 to the user device. A user of the user device 104 is then able to review the customized report and ascertain the functions that their personal IoT network may actually perform, or no longer perform, as a result of the applied software update. This may be in a more specific and accessible kind of language than the generic release notes, e.g. in a more human readable format. This can be particularly useful for determining existing functions which have broken as a result of the software update, and can be leveraged for providing solutions to these problems which may not otherwise be understood or immediately discovered prior to the user desiring to make use them.

In embodiments, it may be possible for the update control manager 203 to automatically determine one or more potential solutions in order to enable the one or more disabled functions. Such solutions may be detailed in the customized report to indicate to the user said one or more determined potential solutions. As mentioned above, marketing content may be incorporated into a suggested possible solution to any disabled function of the two or more wireless devices if such a solution is possible. Other types of solution, and combinations of these solutions, may also be detailed in the customized report. For example the one or more solutions may comprise one or more of: suggested additional hardware not currently within the network, suggested uninstall and reinstallation of the software update, or suggested additional software updates to further wireless devices of the network which were not included in the applied software update.

Establishing solutions for networked systems is not trivial. However, during testing of new software updates a software developer may find potential issues that are related to software versions and device settings in a particular network configuration. The developer may then establish the root cause and one or more solutions for such issues. Based on this knowledge or experience the developer can then enhance the update control manager 203, or the data set used by the update control manager 203, to recognize the particular configurations that trigger such issues. When the update control manager then encounters any of these triggers which result in such an issue it may suggest solutions that have been found by the developer to address the issue.

Such testing could be conducted by an in-house software development team based on known common configurations and functionality as used by most users. Alternatively, such testing could be conducted using external expert users that are part of a beta-test panel prior to releasing the software update into the mainstream market. In embodiments the signalling, requests, responses, and data transfer may work as follows.

After applying the software update, the IoT wireless device may report its new software version and upload logs including potential problems which happened during the software update to the cloud, for example that some scenes or routines are broken in the lighting system. The user may receive a push notification on an app of their user device (e.g. a companion app as discussed above), once the software update has finished being applied. In response to the user opening the app, the app may send a request to the cloud including the updated IoT wireless device ID (e.g. a bridge ID). The cloud platform, knowing the new software version and the previous software version, may respond back to the app with one or more of: a combined list of new features added in the new software version (and possibly previous features which are still enabled, until a particular number of versions have been covered); a list of problems which happened during the software upgrade for this specific IoT device and links to articles about how to fix them; and a list of warnings which happened during software update. Information about the user's network properties may be used to customize some of these lists at stages either at the cloud platform, at the user device, or at the bridge before.

Taking a connected lighting system bridge as an example, assume a user's bridge has software version 1.0, and subsequently a provider releases software versions 1.1, 1.2 & 1.3 for the bridge. Once the user opens their app and starts the software update, their bridge will be updated to software version 1.3, and they will receive customized release notes that include: a list of all new features in software versions 1.1, 1.2 & 1.3; some information about functions that were disabled during software update and links about how to fix them (e.g. scenes that were previously enabled and now will not be rendered properly, or light states that are no longer available and so now cannot be used); and information about how to better tune this updated bridge.

Applying this methodology, users will no longer receive the generic "what's new" messages once they get a software update, but they will receive information that is specifically relevant to their device. For example, by applying this invention in lighting systems, users will have more visibility about how software updates have affected how they use their lighting system. In particular, it is presently almost impossible to inform users if a software update broke the way their lighting scenes, routines, or accessories previously worked.

In embodiments, the customized report may comprise a link to a website where the user can purchase the additional hardware, as signified in the earlier example. Similarly the link may lead the user to a part of the settings for the wireless device in question such that they may make a particular change to enable the function again. By guiding users to fix the behavior issues the system may establish fixes for particular issues that occur. For example, if the software update is known to result in a light scene being disabled, the customized report might include clickable links that lead the user to the scene configuration screens in the app, possibly including some help notes to allow the user to fix the behavior.

In embodiments, the update report may comprise information on whether the applied update was successful, unsuccessful or partially successful. If partially successful the report may comprise details of which parts of the update were unsuccessful. For example, the possible solution to such a report may be to uninstall and reinstall the applied software update, or a particular part of the applied update. In some cases the applied update may comprise a number of separable updates. In this instance, if one of the separable updates was not successful the solution may be to uninstall and reinstall this smaller part of the applied update, without uninstalling and reinstalling the whole of the applied update. This may be the case if the applied update included separable updates which were applied to more than one different wireless devices of network 110. Therefore although herein the applied update is considered as a single update, it may be a single update event comprising separable updates individually applied to a plurality of the wireless devices. Thus, in this case one update to one device may require uninstalling and reinstalling to solve an update error, but the whole of the applied update performed on the network 110 may not all need to be included in this solution.

In embodiments, the customized report may accumulate the effects of multiple updates (possibly which may have been carried out on multiple separate occasions), and indicate these as a net effect of the multiple updates. This may also be the case when as described above, multiple separable updates are performed and applied together as a single update event.

The performing of the software update may comprise wirelessly delivering said update to said at least one wireless device in order to cause the software update to be installed thereon.

As mentioned above, many IoT wireless devices do not comprise displays or other input/output capabilities. That is to say, each of the two or more wireless devices may comprise neither a display screen nor a voice or audio interface.

In embodiments, the two or more wireless devices may comprise no user interface at all. For example, many Bluetooth speakers do not have any way of inputting instructions and are operated solely through a companion application or according to input provided at a user device to which the speaker is paired.

The update or updates may not be initiated by the user. Similarly, in embodiments, the centralized network element may push the customized report to the user device despite not being requested by the user.

In embodiments, the lighting system or IoT wireless device network may not keep information about updates stored locally. The update information may be supplied to the back-end, as both pre-update and post-update statuses, and stored on memory there. The back-end, or whichever centralized network element is gathering the information and creating the customized report, may check for eligibility of features and potential problems by requesting the relevant update information and properties of the two or more wireless devices from the particular memory, as long as the network element has the algorithm for performing those processes.

It will be appreciated that the above embodiments have been described by way of example only. For instance, the applicability of the disclosed techniques is not restricted to connect lighting systems, and more generally can be applied to any network of wireless devices, e.g. IoT devices such as networked home appliances. Further, the system does not necessarily require a back-end network 102, storage 106 or server 108. In alternative embodiments all the functionality of the update report manager 203 can be implemented on one or more components of the wireless network 110. Further, the wireless network does not necessarily have to involve a bridge 112 or other such intermediary element. E.g. in other embodiments the wireless network may use only one wireless protocol understood by all the wireless devices 112-122 and user device 104, and/or the wireless network 110 could take the form of a mesh network.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of reporting on a software update performed on a network composed of at least a plurality of wireless devices; the method comprising, at a centralized network element:
   i) detecting one or more properties of the two or more wireless devices in the network, wherein prior to the update the network is installed with operating software on one or more of the plurality of wireless devices that enables one or more existing functions across the plurality of wireless devices, the update being applied to the operating software on at least one of said one or more wireless devices and affecting operation of two or more of the plurality of wireless devices,
   ii) reading the update to determine one or more deleted functions of said two or more devices which the update is programmed to implement, and
   iii) receiving an electronic update report reporting whether or not the software update was successfully installed in memory of said at least one wireless device, wherein at least one function of said two or more devices has been deleted;
   for each software update reported to be successfully installed in iii), comparing the deleted functions determined in ii) against the properties detected in i) in order to establish which of the existing functions are now disabled within the network due to the update;
   determining one or more potential solutions to enable the one or more disabled functions;
   creating a customized report indicating said disabled functions and indicating said one or more determined potential solutions; and
   outputting the customized report to be output to a user via a user device of the user.

2. The method of claim 1, wherein the one or more properties comprise one or more capabilities, settings and/or spatial configurations of the two or more wireless devices.

3. The method of claim 2, wherein the one or more properties comprise at least the one or more capabilities, and the detecting of the capabilities comprises detecting a model ID of each of the two or more wireless devices and looking up which capabilities are mapped to each of the IDs in a capabilities database.

4. The method of claim 2, wherein the one or more properties comprise at least the one or more settings, wherein said comparing comprises determine that at least one setting has been set to configure at least one of the now deleted functions and the report reporting that said at least one deleted function has been disabled.

5. The method of claim 1, wherein the at least one device to which the update is applied comprises a bridge for bridging between a first wireless protocol used by the user device to connect to the bridge and a second wireless protocol used by the bridge to connect to other, target ones of the wireless devices including at least said two or more devices; at least one of the deleted functions comprising a function invokable by a command initiated by the user through the user device, transmitted from the user device to the bridge using the first wireless access technology, and forwarded from the bridge to the target devices using the second wireless access technology.

6. The method of claim 5, wherein the centralized network element is the bridge.

7. The method of claim 1, wherein the centralized network element is a server comprising one or more server units at one or more geographic sites, the server connecting to said network via the Internet and a wireless gateway between the Internet and said network.

8. The method of claim 1, wherein the centralized network element is the user device.

9. The method of claim 1, wherein the network comprises a lighting network, and at least some of said plurality of wireless devices are illumination devices.

10. The method of claim 1, comprising wirelessly delivering said update to said at least one wireless device in order to cause the software update to be installed thereon.

11. The method of claim 1, wherein each of the two or more wireless devices comprises neither a display screen nor a voice interface.

12. A non-transitory computer program product embodied on computer readable storage or downloadable from a communication network and configured so as when run on a centralized network element to perform the method of claim 1.

13. A centralized network element for use in reporting on a software update performed on a network composed of at least a plurality wireless devices; the centralized network element comprising:

storage storing code, wherein prior to the update the network is installed with operating software on one or more of the plurality of wireless devices that enables one or more existing functions across the plurality of wireless devices, and the update being applied to the operating software on at least one of said one or more wireless devices and affecting operation of two or more of the plurality of wireless devices; and one or more processors arranged to run the code, the code being configured so as when thus run to perform operations of:
  i) detecting one or more properties of the two or more wireless devices in the network,
  ii) reading the update to determine one or more deleted functions of said two or more devices which the updated is programmed to implement, and
  iii) receiving an electronic update report reporting whether or not the software update was successfully installed in memory of said at least one wireless device, wherein at least one function of said two or more devices has been deleted;
for each software update reported to be successfully installed in iii), comparing the deleted functions determined in ii) against the properties detected in i) in order to establish which of the existing functions are now disabled within the network due to the update;
determining one or more potential solutions to enable the one or more disabled functions;
creating a customized report indicating said enabled disabled functions and indicating said one or more determined potential solutions; and
outputting the customized report to be output to a user via a user device of the user.

\* \* \* \* \*